US010320510B2

(12) United States Patent
Bardalai et al.

(10) Patent No.: US 10,320,510 B2
(45) Date of Patent: Jun. 11, 2019

(54) TE-LINK BANDWIDTH MODEL OF ODU SWITCH CAPABLE OTN INTERFACES

(75) Inventors: Snigdho C. Bardalai, San Ramon, CA (US); Rajan Rao, Cupertino, CA (US); Ashok Kunjidhapatham, Bangalore (IN); Khuzema Pithewan, Bangalore (IN); Biao Lu, Saratoga, CA (US); Ping Pan, San Jose, CA (US); Radhakrishna Valiveti, Fremont, CA (US)

(73) Assignee: Infinera Corporation, Sunnyvale, CA (US)

( * ) Notice: Subject to any disclaimer, the term of this patent is extended or adjusted under 35 U.S.C. 154(b) by 677 days.

(21) Appl. No.: 13/074,579

(22) Filed: Mar. 29, 2011

(65) Prior Publication Data

US 2012/0082455 A1 Apr. 5, 2012

Related U.S. Application Data

(60) Provisional application No. 61/390,001, filed on Oct. 5, 2010.

(51) Int. Cl.
| | |
|---|---|
| *H04J 3/16* | (2006.01) |
| *H04L 12/751* | (2013.01) |
| *H04L 12/729* | (2013.01) |
| *H04L 12/721* | (2013.01) |

(52) U.S. Cl.
CPC .......... *H04J 3/1652* (2013.01); *H04L 45/02* (2013.01); *H04L 45/125* (2013.01); *H04J 2203/0058* (2013.01); *H04J 2203/0067* (2013.01); *H04L 45/62* (2013.01)

(58) Field of Classification Search
CPC ............ H04J 3/1652; H04J 2203/0058; H04J 2203/0067; H04L 45/02; H04L 45/125; H04L 45/62
USPC ..................................... 398/45, 58; 370/252
See application file for complete search history.

(56) References Cited

U.S. PATENT DOCUMENTS

| | | | | |
|---|---|---|---|---|
| 2006/0104309 A1* | 5/2006 | Vissers | ................. | H04J 3/1658 370/474 |
| 2007/0248121 A1* | 10/2007 | Zou | .............................. | 370/498 |
| 2009/0324232 A1* | 12/2009 | So | ....................... | H04Q 11/0062 398/83 |
| 2011/0262128 A1* | 10/2011 | Madrahalli et al. | .............. | 398/2 |

* cited by examiner

*Primary Examiner* — Mandish K Randhawa
(74) *Attorney, Agent, or Firm* — David L. Soltz

(57) ABSTRACT

A method and node are disclosed. In the method, circuitry of a first node generates a link state advertising message including bandwidth information indicative of unreserved number of optical channel data unit containers for a plurality of different types of signals supported by an interface of the first node. The link state advertising message is transmitted from the first node to a plurality of second nodes within a mesh network.

26 Claims, 9 Drawing Sheets

```
                              146   148
   0 1 2 3 4 5 6 7 8 9 0 1 2 3 4 5 6 7 8 9 0 1 2 3 4 5 6 7 8 9 0 1
```

| TYPE (1) | | | LENGTH | 144 |
|---|---|---|---|---|
| SIGNAL TYPE | BW TYPE | FLAGS | RESERVED | |
| UNRESERVED BW IN BYES/SEC AT PRIO 0 | | | | |
| UNRESERVED BW IN BYES/SEC AT PRIO 1 | | | | |
| UNRESERVED BW IN BYES/SEC AT PRIO 2 | | | | |
| UNRESERVED BW IN BYES/SEC AT PRIO 3 | | | | |
| UNRESERVED BW IN BYES/SEC AT PRIO 4 | | | | |
| UNRESERVED BW IN BYES/SEC AT PRIO 5 | | | | |
| UNRESERVED BW IN BYES/SEC AT PRIO 6 | | | | |
| UNRESERVED BW IN BYES/SEC AT PRIO 7 | | | | |

FIG. 11

| SIGNAL TYPE | BANDWIDTH TYPE | UNRESERVED ODUs AT PRIO P |
|---|---|---|
| 2 (ODU2) | 0 (MAX-LSP-BW) | 1 |

FIG. 12

| SIGNAL TYPE | BANDWIDTH TYPE | UNRESERVED ODUS AT PRIO P |
|---|---|---|
| 3 (ODU3) | 0 (MAX-LSP-BW) | 1 |
| 5 (ODU0) | 0 (MAX-LSP-BW) | 32 |
| 1 (ODU1) | 0 (MAX-LSP-BW) | 16 |
| 2 (ODU2) | 0 (MAX-LSP-BW) | 4 |
| 12 (ODU2e) | 0 (MAX-LSP-BW) | 3 |

| SIGNAL TYPE | BANDWIDTH TYPE | UNRESERVED BW AT PRIO P |
|---|---|---|
| 10 (ODUFLEX) | 0 (MAX-LSP-BW) | (32 * 1,254,703) / 8 |

FIG. 13

| SIGNAL TYPE | BANDWIDTH TYPE | UNRESERVED ODUS AT PRIO P |
|---|---|---|
| 3 (ODU3) | 0 (MAX-LSP-BW) | 1 |
| 5 (ODU0) | 0 (MAX-LSP-BW) | 32 (I.E. MAX OF 32 AND 8) |
| 1 (ODU1) | 0 (MAX-LSP-BW) | 16 (I.E. MAX OF 16 AND 4) |
| 2 (ODU2) | 0 (MAX-LSP-BW) | 4 (I.E. MAX OF 4 AND 1) |
| 12 (ODU2e) | 0 (MAX-LSP-BW) | 3 (I.E. MAX OF 3 AND 1) |
| 3 (ODU3) | 1 (UNRES-BW) | 1 |
| 5 (ODU0) | 1 (UNRES-BW) | 40 (I.E. 32 + 8) |
| 1 (ODU1) | 1 (UNRES-BW) | 20 (I.E. 16 + 4) |
| 2 (ODU2) | 1 (UNRES-BW) | 5 (I.E. 4 + 1) |
| 12 (ODU2e) | 1 (UNRES-BW) | 4 (I.E. 3 + 1) |

| SIGNAL TYPE | BANDWIDTH TYPE | UNRESERVED BW AT PRIO P |
|---|---|---|
| 10 (ODUFLEX)) | 0 (MAX-LSP-BW) | (32 * 1,254,703) / 8 |

*FIG. 14*

TE-LINK BANDWIDTH MODEL OF ODU SWITCH CAPABLE OTN INTERFACES

CROSS-REFERENCE TO RELATED APPLICATIONS

The present patent application claims priority to the provisional patent application identified by U.S. Ser. No. 61/390,001 titled "TE-Link Bandwidth Model for ODU Switch Capable OTN Interfaces, filed on Oct. 5, 2010, the entire content of which is hereby incorporated herein by reference.

FIELD OF THE DISCLOSURE

The disclosure generally relates to methods and apparatuses that facilitate the routing of services at various rates or signal types through optical channel data unit (ODU) switched optical transport networks (OTN). More particularly the disclosure relates to bandwidth modeling for OTU/ODU interfaces in support of ODU layer switching by distributing TE-link bandwidth information indicative of unreserved bandwidth for each signal type within a multiplexing hierarchy of signal types supported by the OTU/ODU interfaces between the nodes in ODU switched networks. The bandwidth for fixed ODU rates can be advertised as a number of containers. The bandwidth for variable ODU rates can be advertised as a data rate, such as bytes/second. The TE-link bandwidth information can be saved in a link state database and used for computing routes or paths in the optical transport network for setting up optical channel data unit label switched paths in networks having multiple nodes communicating via communication links. Applications of the optical channel data unit label switched paths are commonly referred to in the art as working connections, unprotected connections and protecting connections. Though the methodologies set forth herein are in the context of GMPLS based TE routing for OTN networks, such methodologies may be applied to any interface/network that supports plesiochronous digital hierarchy (using single or multi-stage multiplexing).

BACKGROUND

Multiprotocol label switching (MPLS) is a scheme in high-performance telecommunication networks which directs and carries data from one node to the next node. In MPLS labels are assigned to data packets. Packet forwarding decisions from one node to the next node in a network are made based on the contents of the label for each data packet, without the need to examine the data packet itself.

Generalized Multiprotocol Label Switching (GMPLS) is a type of protocol which extends multiprotocol label switching to encompass network schemes based upon time-division multiplexing (e.g. SONET/SDH, PDH, G.709), wavelength multiplexing, and spatial switching (e.g. incoming port or fiber to outgoing port or fiber). Multiplexing, such as time-division multiplexing is when two or more signals or bit streams are transferred over a common channel. In particular, time-division multiplexing (TDM) is a type of digital multiplexing in which two or more signals or bit streams are transferred as sub-channels in one communication channel, but are physically taking turns on the communication channel. The time domain is divided into several recurrent timeslots of fixed length, one for each sub-channel. After the last sub-channel, the cycle starts over again. Time-division multiplexing is commonly used for circuit mode communication with a fixed number of channels and constant bandwidth per channel. Time-division multiplexing differs from statistical multiplexing, such as packet switching, in that the timeslots are returned in a fixed order and preallocated to the channels, rather than scheduled on a packet by packet basis.

The optical transport hierarchy (OTH) supports the operation and management aspects of optical networks of various architectures, e.g., point-to-point, ring and mesh architectures. One part of the optical transport hierarchy is a multiplex hierarchy, which is a hierarchy including an ordered repetition of tandem digital multiplexers that produce signals of successively higher data rates at each level of the hierarchy. Shown in FIG. 1 is an exemplary multiplexing hierarchy specified by way of optical channel data units, i.e., ODUj, where j varies from 0 to 4; and optical channel transport units, i.e., OTUk, where k varies from 1 to 4. The optical channel data units refer to a frame format for transmitting data which can be either fixed in the data rate or the data rate can be arbitrarily set.

Examples of optical channel data units that are fixed in the amount of data and data rate include those specified by ODU0, ODU1, ODU1e, ODU2, ODU2e, ODU3, ODU3e1, ODU3e2, and ODU4. An example of an optical channel data unit in which the data rate can be arbitrarily set is referred to in the art as ODUflex One of the properties of the multiplexing hierarchy is that while the data rate changes over the different levels in the multiplexing hierarchy, the frame format can remain the same. An ODU0 frame format 10 is shown in FIG. 2. Like all other ODUjs, the ODU0 frame format 10 includes a structure of four rows and 3824 columns, as presented in FIG. 2. The ODU0 frame format 10 is further divided into an ODUk overhead area 12 (the first fourteen columns) and an optical channel payload unit (OPU) area 14. The optical channel payload unit area 14 contains two columns of overhead and 3808 columns of payload area which is available for the mapping of client data.

The nominal ODU0 rate equals half the optical channel payload unit area 14 rate of an ODU1. The latter is tailored for transport of STM-16/OC-48 signals at 2,488.32 Mbit/s. The ODU0 rate is 1,244.16 Mbit/s±20 ppm, while the rate of the available OPU0 payload area is 1,238.95431 Mbit/s.

Shown in FIG. 3 is a frame format 16 having two ODU0s multiplexed into an ODU1. The payload area of ODU1 frame format 16 of the latter has been divided into two time slots called optical channel tributary unit (or slots) 0 and 1 (ODTU01). ODTU01 is a combination of the payload area as well as a justification area which is shown as Rows 1-4 and Column 16 in FIG. 3. As shown in FIG. 3, each ODU0 is mapped into an ODTU01 time slot using a procedure known in the art as asynchronous mapping procedure (AMP), which is consistent with the legacy mapping of ODUj into ODUk.

The optical channel data units within the multiplexing hierarchy are referred to in the art as lower order or higher order. A higher order optical channel data unit refers to a server layer to which a lower order optical channel data unit (client layer) is mapped to. Optical channel data units include a parameter referred to as tributary slot granularity which refers to a data rate of the timeslots within the optical channel data unit. The tributary slot granularity of optical channel data units include time slots of approximately 1.25 Gbit/s or 2.5 Gbit/s. OPUk (when k=1, 2, 3, 4) is divided into equal sized Tributary Slots or Time Slots of granularity (1.25G or 2.5G) to allow mapping of lower order ODUj (where j<k). For example: On OPU4, there are 80 (1.25G)

Tributary Slots. To map: ODU3 into OPU4=>31 TSs are used; ODU2/2e into OPU4=>8 TS are used; ODU1 into OPU4=>2 TSs are used; and ODU0 into OPU4=>1 TS is used.

ODTUG refers to grouping of ODTU entities that facilitate mapping of any ODUj into ODUk. ODTUjk refers to Optical Channel Tributary Unit j into k. This defines Tributary Slot grouping for mapping ODUj into ODUk. In particular, OPU2 and OPU3 support two tributary slot granularities: (i) 1.25 Gbps and (ii) 2.5 Gbps. Information indicative of tributary slot granularity can be encoded into the overhead of the ODUk optical channel data unit.

"Multi-stage ODU multiplexing", refers to an optical transport network multiplexing hierarchy in which an ODUi container can first be multiplexed into a higher order ODUj container, which is then multiplexed into a higher order—ODUk container. A single-stage multiplexing refers to one lower order ODUj multiplexed into a higher order ODUk. The single stage ODU multiplexing can be heterogeneous (meaning lower order ODUj of different rates can be multiplexed into a higher order ODUk).

Optical transport networks support switching at two layers: (i) ODU Layer, i.e., time division multiplexing and (ii) OCH Layer—Lambda or wavelength switching where OCH stands for Optical Channel. The nodes on the optical transport network may support one or both the switching types. When multiple switching types are supported Multi-Layer Network (MLN) based routing as described in [RFC5339] is assumed.

Generalized Multiprotocol Label Switching includes multiple types of optical channel data unit label switched paths including protection and recovery mechanisms which specifies predefined (1) working connections within a shared mesh network having multiple nodes and communication links for transmitting data between the nodes; and (2) protecting connections specifying a different group of nodes and/or communication links for transmitting data in the event that one or more of the working connections fail. Data is initially transmitted over the optical channel data unit label switched path referred to as a working connection and then when a working connection fails, the Generalized Multiprotocol Label Switching protocol automatically activates one of the protecting connections for redirecting data within the shared mesh network.

However, the mechanisms defined in GMPLS for setting up the optical channel data unit label switched paths have overlooked a number of issues related to the multiplexing hierarchy. In particular, the present mechanisms defined in GMPLS permit the nodes to distribute TE-Link information including the maximum label switched path bandwidth in bytes/second. It might appear that this parameter alone should allow the determination of the number of units of a particular signal type (e.g. ODU0/ODU1/ODU2 etc.) a given link can support with the currently advertised cumulative unreserved bandwidth; the procedure is to divide the cumulative unreserved bandwidth by the nominal rate of the desired signal type (which is documented in G.709). There are reasons why this simple reasoning fails: (a) the OPUk (k=1/2/3/etc.) payload bandwidth is partitioned into the form of several tributary slots, with a tributary slot granularity of approximately 1.25G or 2.5G (b) the OPUk payload bandwidth is allocated in multiples of tributary slots (c) there is some bandwidth wastage due to excess capacity in the tributary slot. Thus for example, an OPU4 (on an OTU4 link) tributary slot has a nominal bandwidth of 1.301G, whereas the ODU0 bandwidth is approximately 1.24G. As such, approximately 0.06G of bandwidth is "wasted" within each tributary slot that is carrying an ODU0 signal. Over the 80 tributary slots, this amounts to a cumulative wastage of approximately 80*0.06G or 4.8G. A simple calculation of the form 80*1.301G/1.24G would suggest that 83 ODU0s can be carried within an OTU4, whereas only 80 ODU0 can be really multiplexed at the first level (equal to the number of tributary slots in OPU4). This example establishes that even on a link with a single-stage of ODU multiplexing, the cumulative bandwidth can't be used for determining the number of various signal types that can be supported, during path computation at the source node (or head-end).

Another limitation of advertising only the cumulative unreserved bandwidth in bytes/sec is as follows. This scenario happens when multi-stage ODU multiplexing is involved (either due to user choice, or due to restrictions in the hardware supporting the OTUk interfaces). Multi-stage ODU multiplexing can fragment the unreserved bandwidth into fragments which cannot be combined so as to be able to transport a signal of sufficiently large bandwidth. For example, assume that an ODU3 interface only supports the direct multiplexing of 4×ODU2 into the ODU3 container; in other words, ODU0 and ODU1 cannot be directly multiplexed into the ODU3 container (which is allowed by G.709). Here, the mapping of ODU1 and ODU0 is possible only through second stage multiplexing underneath ODU2. If two ODU1 are created under two different ODU2, only two more ODU2 can be created further on the interface although 28 Tributary Slots (1.25 Gbps) are unreserved on the interface (ODU hierarchy). This can result in unused bandwidth since all the unreserved Tributary Slots cannot be used in a concatenated fashion; such concatenation of tributary slots is possible at first level within the OPUk.

A further limitation of advertising the cumulative unreserved bandwidth mechanism appears in the context of bundled links. In bundled links, advertising only the total unreserved bandwidth does not give enough information about the distribution of the unreserved bandwidth among the component links of the bundle; the problem is compounded by the fact that OTUk links with dissimilar rates (and hence dissimilar tributary slot bandwidth granularities) are allowed to be bundled. Without knowing the distribution of unreserved bandwidth among the component links (and the tributary slot bandwidth for the component links), it is impossible to accurately evaluate the number of ODU signal of a given type that can be carried over the bundled link.

The mechanism proposed in this disclosure circumvents all these problems by advertising the exact number of ODU containers (of each ODU signal type with a fixed rate) the link is able to carry. For ODUflex containers which can have arbitrary rates, the proposed mechanism advertises the total bandwidth unreserved for this signal type.

The presently disclosed and claimed inventive concept supports ODU layer switching between the nodes in ODU switched networks to reduce the described drawbacks of the conventional GMPLS system. This can be accomplished by distributing TE-link bandwidth information indicative of number of unreserved ODU containers for each signal type within a multiplexing hierarchy of signal types supported by the OTU/ODU interfaces.

SUMMARY

A method and node are disclosed. In the method, circuitry of a first node generates a link state advertising message including bandwidth information indicative of unreserved number of optical channel data unit containers for a plurality of different types of signals supported by an interface of the first node. The link state advertising message is transmitted from the first node to a plurality of second nodes within a mesh network.

In another aspect, the presently disclosed concepts describe a method in which circuitry of a first node, generates a link state advertising message including bandwidth information indicative of unreserved bandwidth in data rate that has not been reserved for a label switched path for a signal type having an arbitrary data rate supported by an interface of the first node. The link state advertising message is transmitted from the first node to a plurality of second nodes within a mesh network.

In another aspect, the presently disclosed inventive concepts describe a node, comprising an input interface, an output interface, a switch and a control module. The input interface supports a first plurality of different types of signals for receiving traffic from a first link. The output interface supports a second plurality of different types of signals for transmitting traffic to a second link. The switch communicates the traffic from the input interface to the output interface, and the control module utilizes GMPLS protocols and controls the input interface, the output interface and the switch. The control module generates a first link state advertising message including bandwidth information indicative of unreserved number of optical channel data unit containers for the first plurality of different types of signals, and a second link state advertising message including bandwidth information indicative of unreserved number of optical channel data unit containers for the second plurality of different types of signals.

In one aspect, the node or first node referred to above in this section has a plurality of optical channel data unit containers for the plurality of the different types of signals with first ones of the plurality of the optical channel data unit containers being identified in a label switched path and second ones of the plurality of the optical channel data unit containers not identified in a label switched path. The number of second ones of the plurality of optical channel data unit containers can be the unreserved number of optical channel data unit containers.

In another aspect, the input interface can also support a signal type having an arbitrary data rate, preferably set by an operator for receiving traffic from the first link. In this aspect, the control module generates a link state advertising message including bandwidth information indicative of unreserved bandwidth in data rate for the signal type. The data rate can be expressed, for example, in bytes/second.

In yet another aspect, the input interface supports at least two priority levels, and wherein the link state advertising message generated by the control module includes bandwidth information in data rate that has not been reserved in a label switched path at the at least two priority levels.

BRIEF DESCRIPTION OF THE DRAWING

As discussed above, the present disclosure describes a system which support ODU layer switching by distributing TE-link bandwidth information indicative of unreserved bandwidth in data rate such as bytes/second for signal type(s) having an arbitrary data rate selected by the operator and/or ODU containers for each signal type having a fixed data rate within a multiplexing hierarchy of signal types supported by the OTU/ODU interfaces between the nodes in ODU switched networks.

The accompanying drawings, which are incorporated in and constitute a part of this specification, illustrate one or more implementations described herein and, together with the description, explain these implementations. In the drawings:

FIG. 11 is a schematic diagram of an exemplary sub-Type/Length/Value (sub-TLV) message transmitted by a switch node to inform other switch nodes of bandwidth information for a signal type having a varying bit rate, such as ODUflex in accordance with the present disclosure.

FIG. 12 is a table showing sample values for an exemplary ODUk—Switch Capability Specific Information field of the link state advertising message set forth in FIG. 10 for a link supporting only an ODU2 line rate service.

FIG. 13 is a table showing sample values for an exemplary ODUk—Switch Capability Specific Information field of the link state advertising message set forth in FIG. 10 for an OTU3 interface that supports switching at line rate ODU3 and lower rates ODU0, ODU1, ODU2, ODU2e and ODUflex via multiplexing.

FIG. 14 is a table showing sample values for an exemplary ODUk—Switch Capability Specific Information field of the link state advertising message set forth in FIG. 10 for a bundled link involving OTU3, OTU2 and OTU2e interfaces that supports switching at lower order ODUs.

DETAILED DESCRIPTION

Figure 1:
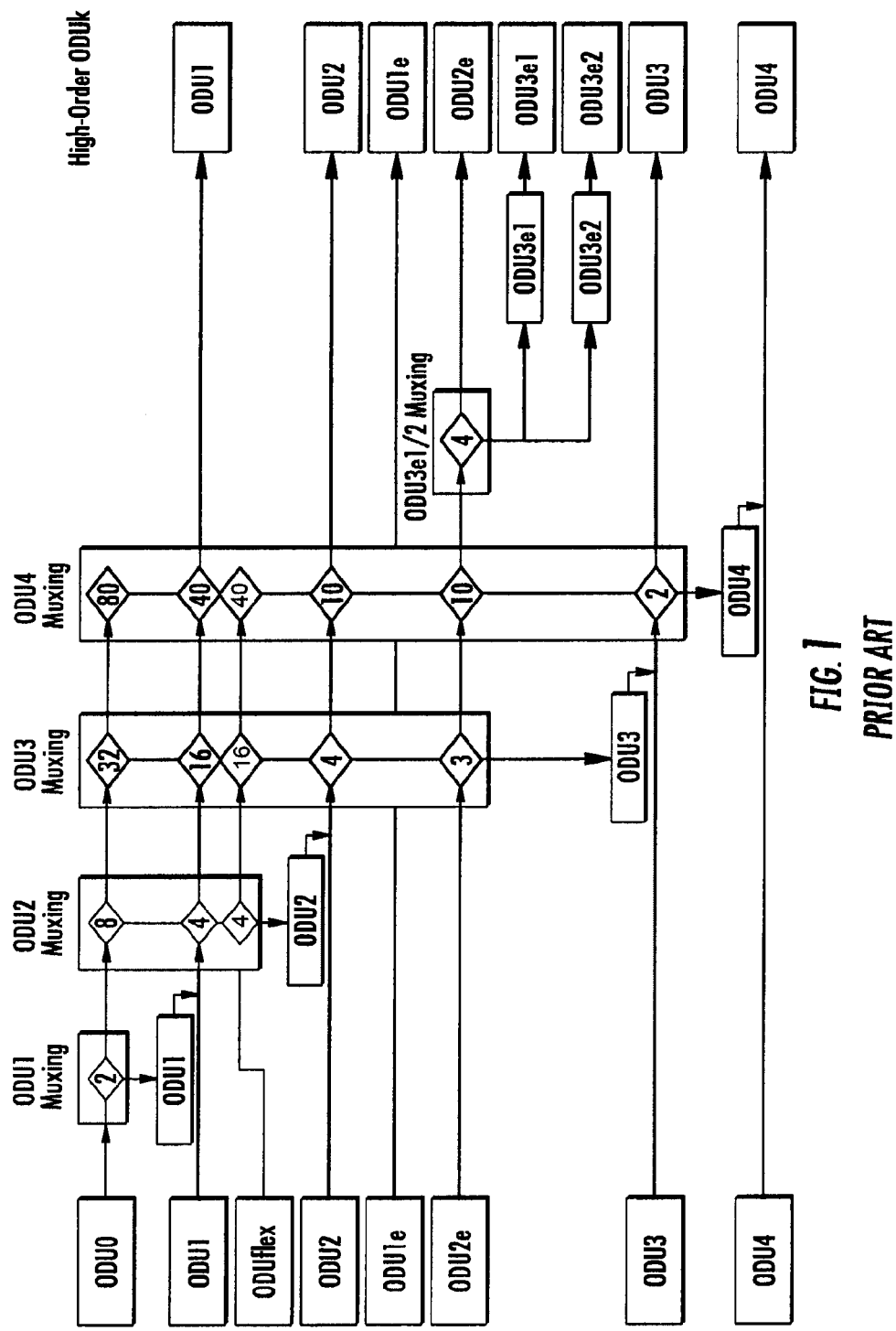
FIG. 1 is a diagram of a prior art multiplexing hierarchy in accordance with ITU-T G.709 (dated December 2009) utilized for communicating between nodes within a network.
Figure 2:
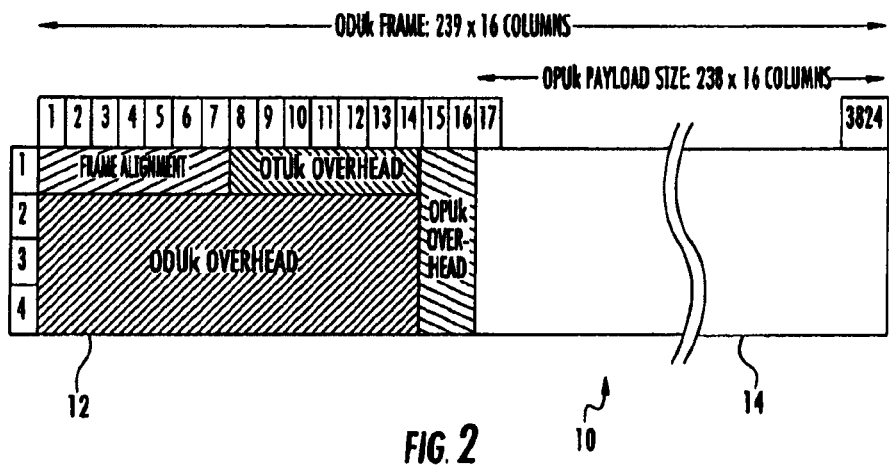
FIG. 2 is a block diagram of a prior art optical channel data unit frame in accordance with ITU-T G.709 (dated December 2009) format that may be used in embodiments of the inventive concepts described within the present disclosure.
Figure 3:
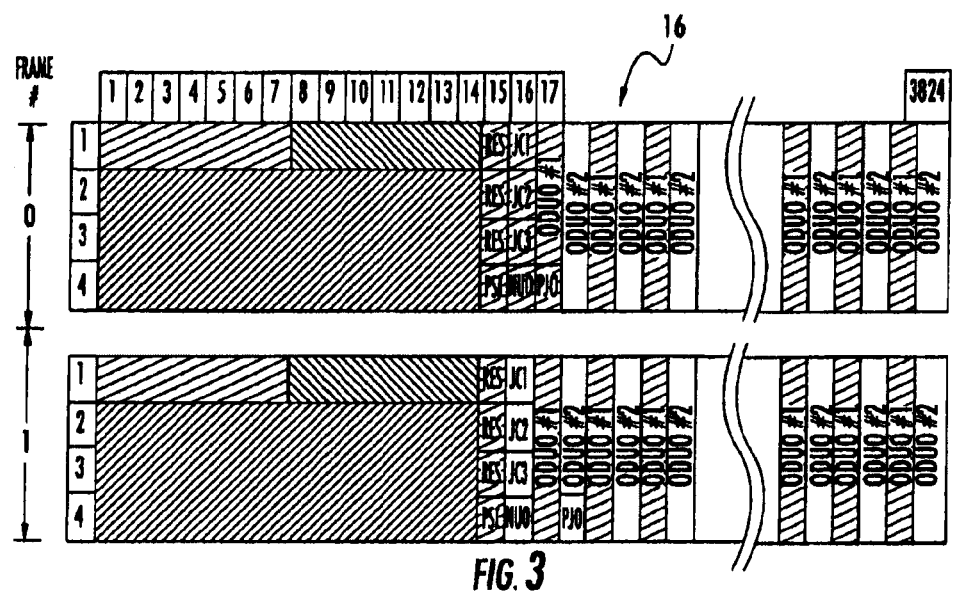
FIG. 3 is a block diagram of two ODU0 optical channel data units multiplexed within an ODU1 frame in accordance with ITU-T G.709 (dated December 2009).

The following detailed description refers to the accompanying drawings. The same reference numbers in different drawings may identify the same or similar elements.

Definitions

If used throughout the description and the drawings, the following short terms have the following meanings unless otherwise stated:

AMP stands for Asynchronous Mapping Protocol.

DCC stands for Dedicated Data Communication Channels.

GCC stands for General Communication Channel which is an in-band side channel used to carry transmission management and signaling information within Optical Transport Network elements.

GMPLS stands for Generalized Multi-Protocol Label Switching which extends Multi-Protocol Label Switching to encompass time-division (for example, SONET/SDH, PDH, G.709), wavelength (lambdas), and spatial multiplexing (e.g., incoming port or fiber to outgoing port or fiber). The GMPLS framework includes a set of routing protocols which runs on a control module. The Generalized Multiprotocol Label Switching architecture is defined, for example in RFC 3945.

IETF stands for Internet Engineering Task Force.

IP stands for Internet Protocol which is a protocol used for communicating data across a packet-switched internetwork using the Internet Protocol Suite, also referred to as TCP/IP.

LSP stands for Label Switched Path which is a path through a Multi-Protocol Label Switching network. Note that Label Switched Paths can be bidirectional or unidirectional; they enable packets to be label switched through the Multiprotocol Label Switched network from a port on an ingress node to a port on an egress node.

MPLS stands for multi-protocol label switching which is a scheme in telecommunications networks for carrying data from one node to the next node. MPLS operates at an OSI model layer that is generally considered to lie between traditional definitions of layer 2 (data link layer) and layer 3 (network layer) and is thus often referred to as a layer 2.5 protocol.

OSC stands for Optical Supervisory Channel which is an additional wavelength that normally carries network management information within an optical network.

OTN stands for Optical Transport Network which includes a set of optical switches which are connected by optical fiber links.

SONET/SDH stands for Synchronous Optical Networking/Synchronous Digital Hierarchy which are standardized multiplexer protocols that transfer multiple digital bit streams over optical fiber using lasers or light emitting diodes.

Description

ITU-T recommendations G.709 and G.872 define OTN interface requirements and network architecture respectively. Currently, OTN networks support switching at two layers, namely, (a) Optical Channel Layer (Lambda Switching) and (b) ODU Layer (TDM switching). ODU Layer switching is supported directly at a line rate—ODUk or a lower rate—ODUj (via single/multi-stage multiplexing).

As discussed above, the mechanisms defined in GMPLS for setting up the optical channel data unit label switched paths have overlooked a number of issues related to the multiplexing hierarchy. In particular, the conventional mechanisms defined in GMPLS permit the nodes to distribute TE-Link information including the maximum label switched path bandwidth in bytes/second. However, the present mechanism can't be used for determining the number of various signal types that can be supported during path computation at a source node, or head-end node. Further limitations of the conventional mechanisms include unused bandwidth, due to multi-stage multiplexing fragmentation, as well as an inability of the cumulative unreserved bandwidth to provide enough information about the distribution of the unreserved bandwidth among the component links. All of these limitations are overcome by advertising the exact number of unreserved ODU containers (of each ODU signal type with a fixed rate) the link is able to carry. Unreserved ODU containers may not be identified in a label switched path. For ODUflex containers which can have arbitrary rates, the present disclosure advertises the total bandwidth unreserved, preferably by data rate, for this signal type.

Consistent with the present disclosure, a bandwidth model for OTU/ODU interfaces is provided that facilitates routing of services at various rates through ODU switching.

The present disclosure addresses the following features associated with OTN interfaces:

(a) Support for multi-stage ODU multiplexing (Eg: ODU4-ODU3-ODU2-ODU1)

(b) Support for two OPU Tributary Slot (TS) Granularities (1.25 Gbps and 2.5 Gbps) for ODU2 and ODU3.

(c) Support for differences in the OPUk tributary slot rates for different values of k (k=1/2/3/3e2/4 and the like.

(d) Support for ODUflex rates that use an arbitrary number of Tributary Slots.

(e) Support for VCAT services [ODUj-Xv].

Exemplary OTN interfaces include an OTU interface and an ODU interface.

Figure 4:
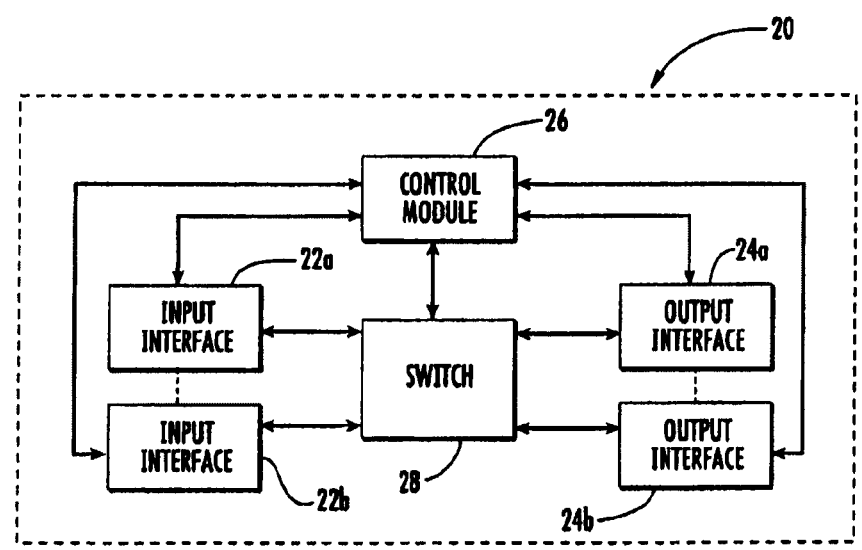
FIG. 4 is an exemplary switch node constructed in accordance with the present disclosure.
Figure 5:
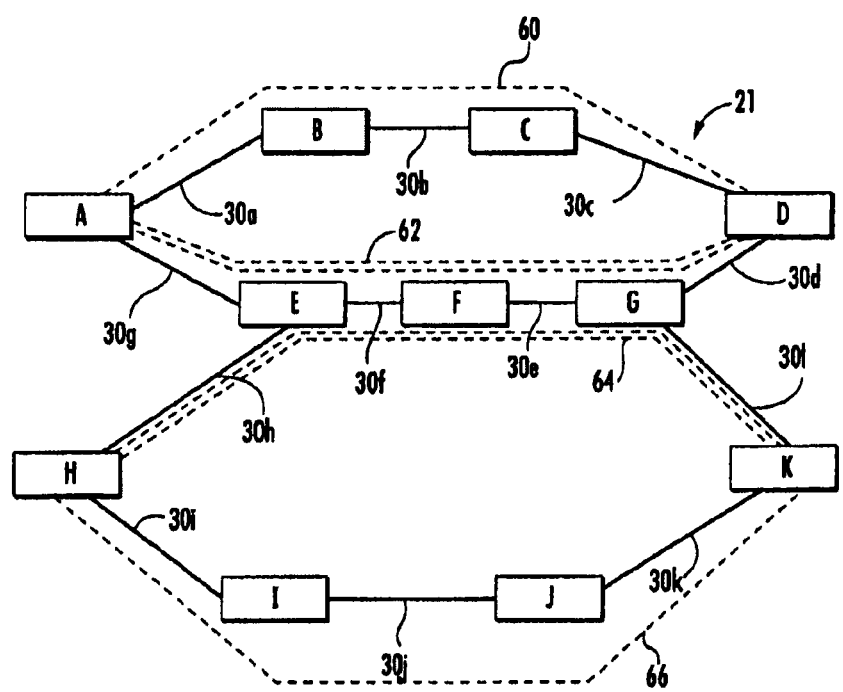
FIG. 5 is a block diagram of an exemplary network constructed in accordance with the present disclosure.

Referring now to the drawings, and in particular to FIG. 4, shown therein and designated by reference numeral 20 is an exemplary node constructed in accordance with the present disclosure. As will be discussed in more detail below, the node 20 is adapted to facilitate the communication of data (which may be referred to herein as "traffic") between multiple nodes 20 in a mesh network 21 (as shown in FIG. 5 with the notations A-K). The node 20 is provided with one or more input interfaces 22, one or more output interfaces 24, a control module 26, and a switch 28.

In general, the input interfaces 22 are adapted to receive traffic from the mesh network 21, and the output interfaces 24 are adapted to transmit traffic onto the mesh network 21 (See FIG. 5). The switch 28 serves to communicate the traffic from the input interface(s) 22, to the output interface(s) 24. And, the control module 26 serves to control the operations of the input interfaces 22, the output interfaces 24, and the switch 28, as well as to set up label switched paths within the mesh network 21.

The node 20 can be implemented in a variety of ways, including, commercial installations having one or more backplanes (not shown), racks, and the like. In this example, the input interfaces 22, the output interfaces 24, the control module 26 and the switch 28 are typically implemented as separate devices, which may have their own power supply, local memory and processing equipment. In another example, the node 20 can be implemented as a single device having a shared power supply, memory and processing equipment. Or, in another example, the node 20 can be implemented in a modular manner in which one or more of the input interfaces 22, the output interfaces 24, the control module 26 and the switch 28 share a power supply and/or housing.

The input interfaces 22, and the output interfaces 24 of one node 20 are adapted to communicate with corresponding input interfaces 22, and output interfaces 24 of another node 20 within the mesh network 21 via communication links 30, which are shown for purposes of clarity as 30*a-l* (as shown in FIG. 5). An example of an input interface 22 and/or an output interface 24 is an Ethernet card or optical port. In general, each of the input interfaces 22 and/or the output interfaces 24 may have a unique logical identification, such as an IP address. The communication links 30*a-l* can be implemented in a variety of ways, such as a physical link including electrical (e.g., copper wire or coax) and/or optical signal (e.g., optical fiber or other waveguide) carrying capabilities, or as a wireless link. The implementation of the input interfaces 22, and the output interfaces 24 will depend upon the particular type of communication link 30 that the particular input interface 22 and/or output interface 24 is designed to communicate with. For example, one of the input interfaces 22 can be designed to communicate wirelessly with another node 20 within the mesh network 21, while one of the output interfaces 24 of the node 20 can be designed to communicate optically through a fiber-optic link. For a particular node 20, the input interfaces 22 can be of the same type or different types; the output interfaces 24 can be of the same type or different types; and the input and output interfaces 22 and 24 can be of the same type or different types.

The input interfaces 22 and the output interfaces 24 are shown separately for purposes of clarity. However, it should be understood that one or more of the input interfaces 22 and/or the output interfaces 24 could be connected to a single communication link 30 and implemented as a single device, such as a line module. The making and using of exemplary line modules are described in the patent application identified by publication no. 20090245289, the entire content of which is hereby incorporated herein by reference.

Figure 6:
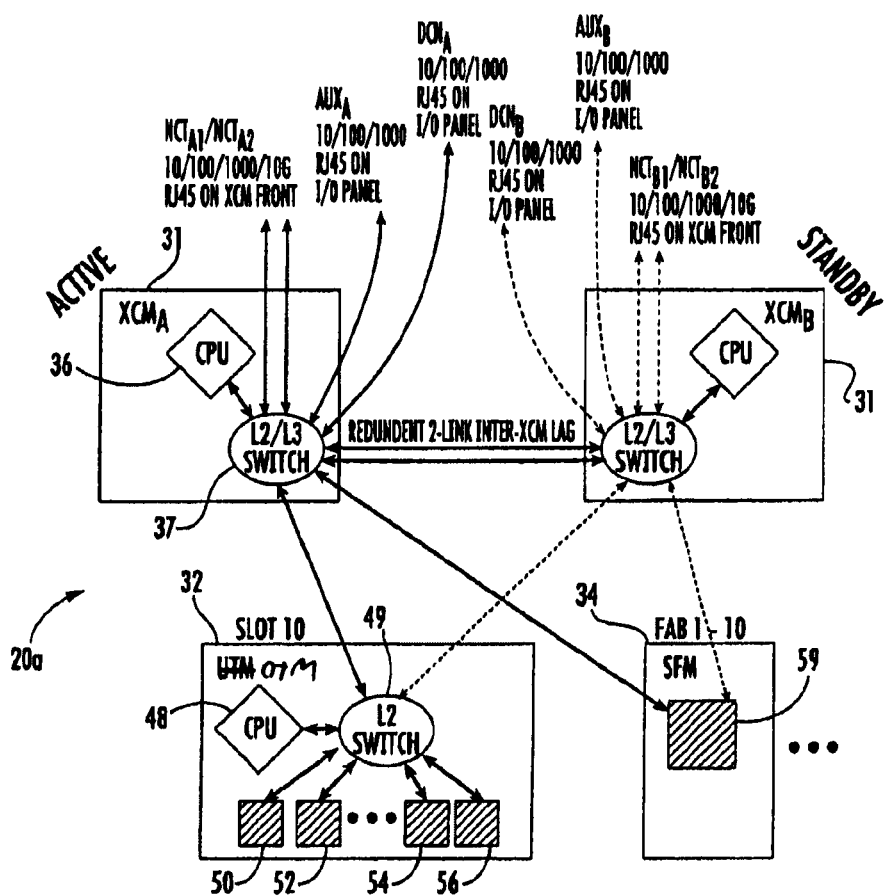
FIG. 6 is a block diagram of another version of a switch node constructed in accordance with the present disclosure.

Referring now to FIG. 6, shown therein is a particular embodiment of a node 20*a* where such node 20 is implemented in a modular manner. The node 20*a* is provided with one or more control modules 31, one or more optical tributary modules (OTM) 32, and one or more switch fabric modules 34. In the example depicted in FIG. 6, the node 20*a* is provided with at least two control modules 31, with at least one of the control modules 31 being actively used, and the other one of the control modules 31 being available as a backup in the event the actively used control module 31 fails or is taken off-line. In general, the control modules 31 are particular implementations of the control module 26 depicted in FIG. 4; the optical tributary module 32 is a particular implementation of the input interfaces 22 and the output interfaces 24; and the switch fabric module 34 is a particular implementation of the switch 28.

In general, the control module 31 is provided with one or more processors 36, which is shown by way of example as a CPU. However, it should be understood that the processors 36 can be implemented in other ways such as field programmable gate array(s) (FPGA), digital signal processor(s), or the like. The control module(s) 31 are also provided with a L2/L3 switch 37 (i.e. Layer 2/Layer 3 switch).

The optical tributary module 32 is provided with one or more processors 48; one or more L2 switch 49; and one or more transport interface modules 50, 52, 54, and 56 communicating with the L2 switch 49 (i.e., Layer 2 switch). The L2 switch 49 also communicates with the control plane L2/L3 switch 37 for communicating control messages between the optical tributary module 32 and the control module(s) 31. The one or more processors 48 is shown by way of example as a CPU; however, it should be understood that the one or more processors 48 can be implemented in other ways such as a field programmable gate array(s) (FPGA), digital signal processor(s), or the like. Certain ones of the transport interface modules 50, 52, 54 and 56 form input interfaces, and other ones of the transport interface modules 50, 52, 54 and 56 form output interfaces. For example, the transport interface modules 50 and 52 can form input interfaces, and the transport interface modules 54 and 56 can form output interfaces.

It should be understood that the nodes 20 and/or 20*a* can be implemented in a variety of ways including those shown and discussed in U.S. Patent Application No. 20090245289 entitled "Programmable Time Division Multiplexed Switching" the entire content of which is hereby incorporated herein by reference.

Returning to FIG. 5, shown therein is the mesh network 21 formed of multiple nodes 20 and/or 20*a* which are labeled as A-K in accordance with the present disclosure. The mesh network 21 can include more than eleven nodes, but eleven are shown for purposes of clarity. In particular, the nodes A, B, C and D are configured to communicate via a first optical channel data unit label switched path 60 along the communication links 30*a*, 30*b*, and 30*c*; while the nodes A, E, F, G and D are also configured to communicate via a second optical channel data unit label switched path 62 via the communication links 30*d-g*. The first optical channel data unit label switched path 60 may be a working connection, and the second optical channel data unit label switched path 62 may be a protecting connection. Any two or more of the nodes A-K may connect via multiple optical links 30. For bidirectional communication, for example, an optical link or fiber may be dedicated for data traffic transmitted in one direction (or both directions), another optical link may be dedicated for data traffic transmitted in the opposite direction, and yet another optical link may be used in case of a failure of the connection. In practice, there may be N working connections and M protecting connections between any two of the nodes A-K, where M<N.

Figure 10:
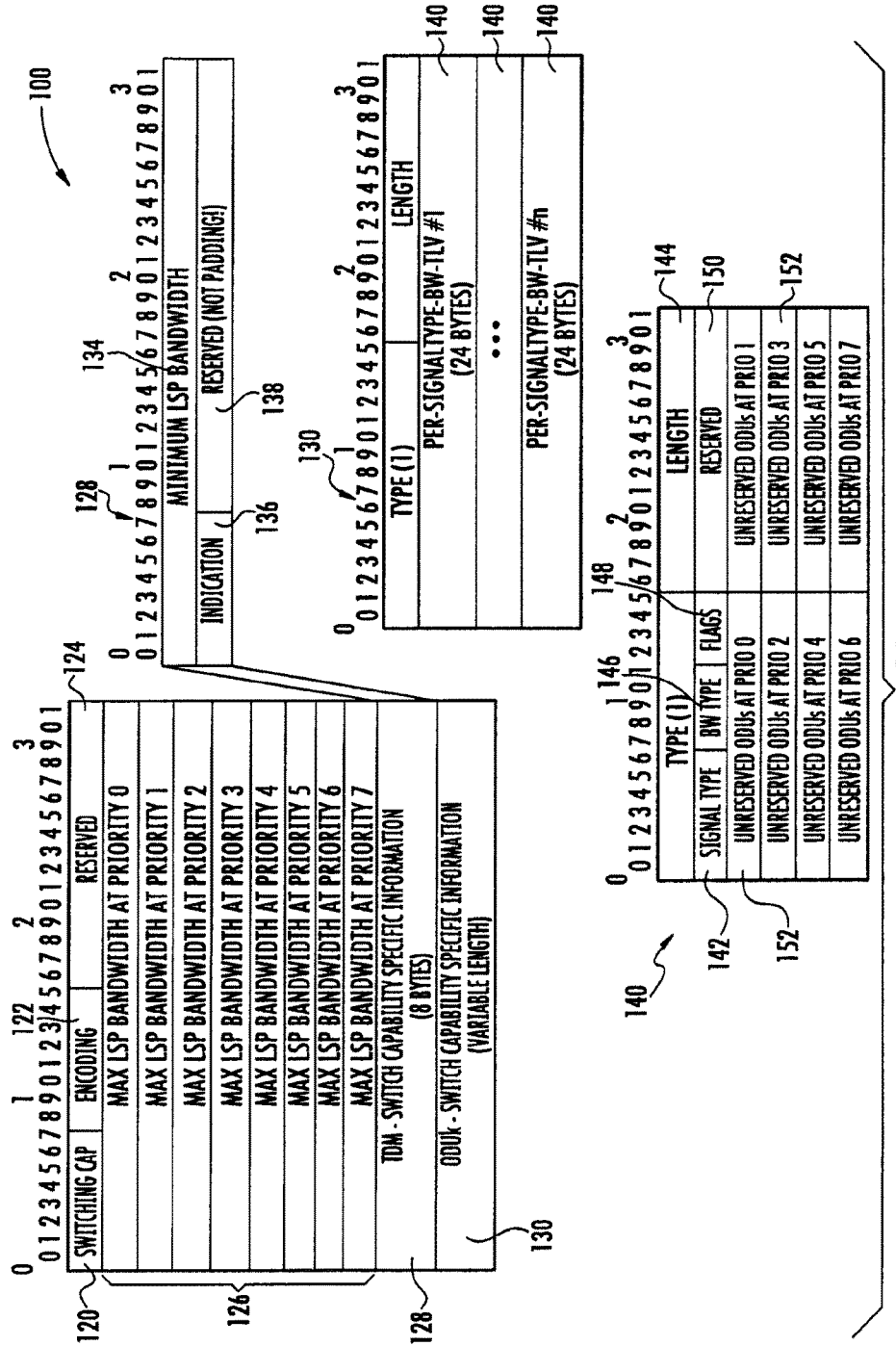
FIG. 10 is a schematic diagram of an exemplary link state advertising message transmitted by a switch node to inform other switch nodes within the mesh network of bandwidth information per signal type to support bandwidth encoding for OTU/ODU TE-Links.

More particularly, FIG. 5 shows an exemplary operation environment for a bandwidth modeling protocol stored on one or more non-transitory computer readable medium and executed by one or more processor of the control module 26 and/or control module 31 of each of the nodes A-K. Exemplary non-transitory computer readable mediums include read-only memory, random access memory, an EEPROM, a hard disk, solid-state drive, flash memory, an optical disk, combinations thereof or the like. The bandwidth modeling protocol distributes TE-link bandwidth information indicative of the number of unreserved ODU containers for each signal type having a fixed data rate; and data rate for ODU containers having an arbitrarily set data rate (such as ODU-flex) within a multiplexing hierarchy of signal types preferably supported by ODU/OTU interfaces between the nodes A-K in the shared-mesh GMPLS network 21. The TE-link bandwidth information is preferably stored within a link state database (not shown) accessible by or stored within the nodes A-K and can be used for computing the optical data unit label switched paths 60 and 62 using set up messages as known in the art. The TE-link bandwidth information includes a link state advertising message. Each of the nodes A-K determines, unreserved tributary slots for the plurality of different types of signals supported by its interfaces 22 and 24 (See FIG. 4). Then, a link state advertising message 100 (an example of which is shown in FIG. 10) is generated and includes bandwidth information indicative of the number of unreserved ODU containers for the plurality of different types of signals. In other words, each node A-K advertises bandwidth information of its associated interfaces 22 and 24 independently. The bandwidth information is preferably flooded to all nodes A-K in the network 21 (and preferably via Open Short Path First (OSPF)). As a result, each of the nodes A-K in the network 21f builds an identical link state database of the bandwidth information for the entire network 21. Using the link state database, any node A-K can compute an ODUj path. For example, assuming that the node A determines the unreserved number of ODUs (based upon tributary slot granularity) for the plurality of different types of signals unreserved on the interfaces 22 and 24 for the node A, the node A generates the link state advertising message 100 for each interface 22 and 24 and then transmits the link state advertising messages 100 to the other nodes B-K within the shared-mesh GMPLS network 21. The nodes B-K receive the link state advertising messages 100 and then preferably store the bandwidth information contained in the link state advertising messages 100 within the link state database. Then, optical data unit label switched paths, such as the first and second optical data unit label switched paths 60 and 62 are computed using the bandwidth information of the link state advertising messages 100 from nodes B-K, and then provided within the shared-mesh GMPLS network 21. The link state advertising messages 100 can be generated and then provided to the relevant nodes B-K preferably using an out of band communication channel of the shared-mesh GMPLS network 21. Suitable control channels include those identified in the art as GCC/DCC/OSC and such acronyms are defined above. In other words, the link state advertising messages 100 are preferably transmitted on a different communication link than is used to convey user traffic or data such as the communication links 30a-l.

As discussed above, ITU-T recommendations G.709 and G.872 define OTN interface requirements and network architecture respectively. Currently, OTN networks support switching at two layers, namely, (a) Optical Channel Layer (Lambda Switching) and (b) ODU Layer (TDM switching). ODU Layer switching is supported directly at line rate—ODUk or lower rate—ODUj (via single/multi-stage multiplexing).

The Bandwidth modeling disclosed herein preferably addresses the following key challenges of OTU/ODU interface features:

(a) Support ODU multi-stage multiplexing hierarchy and yet not require advertising of complete hierarchy tree;

(b) Account for bandwidth fragmentation that can result due to the restricted multiplexing hierarchy supported on an OTN interface. For example, assume that an ODU3 interface supports direct multiplexing of ODU2 only. Here, mapping of ODU1 and ODU0 is possible only through second stage multiplexing underneath ODU2. If two ODU1 are created under two different ODU2, only two ODU2 can be created further on the interface although 28 Tributary Slots (1.25 Gbps) are unreserved on the interface (ODU hierarchy).

(c) Hide the bandwidth modeling and route computation complications associated with supporting multiple Tributary Slot Granularities (1.25 Gbps and 2.5 Gbps) from the bandwidth model and thereby simplify the end-to-end optical data unit label switched path computation. The bandwidth model preferably presumes that the Tributary Slot Granularities are pre-negotiated as a part of link discovery or pre-configured locally on the ends of the optical data unit label switched path.

(d) For utilizing ODU-Flex, absolute bandwidth required (for CBR or GFP mapped service) is preferably to be mapped to 'n' Tributary Slots of certain bit rate. Preferably, Tributary Slot bit-rate and unreserved number of Tributary slots are advertised.

(e) Support co-routing of VCAT members [ODUj-Xv] over the same component link and link bundle.

(f) Support bundling of OTU/ODU interfaces of different rates and different multiplexing capabilities.

TE-Link Representation

G.709 OTU/ODU Links, such as the links 30a-l can be represented as TE-Links in GMPLS Traffic Engineering Topology for supporting ODU layer switching. A TE-link is a logical grouping of network resources for the purpose of TE advertisement and path selection. TE stands for "Traffic Engineering" which is a technology that is concerned with performance optimization of operational networks. In general, TE includes a set of applications mechanisms, tools, and scientific principles that allow for measuring, modeling, characterizing and control of user data traffic in order to achieve specific performance objectives. These TE-Links can be modeled in multiple ways. Some of the prominent representations are captured below and shown by way of example in FIGS. 7-9.

(a) OTUk TE-Link

Figure 7:
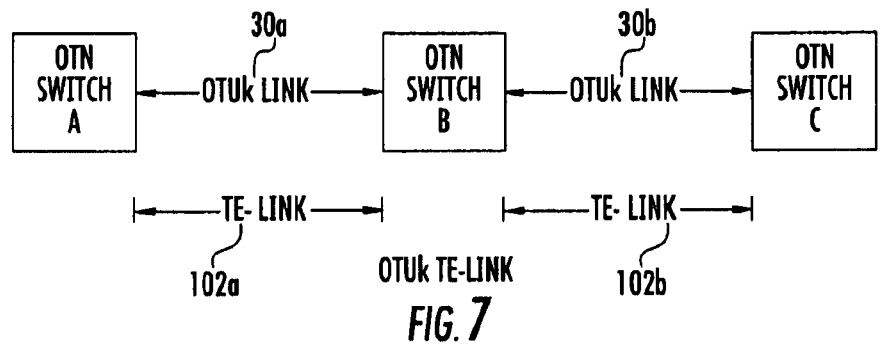
FIG. 7 is a block diagram of a section of the network depicted in FIG. 5 illustrating an example of modeling TE-links. The TE-link bandwidth information is distributed between the switch nodes in accordance with embodiments of the present disclosure.
Figure 8:
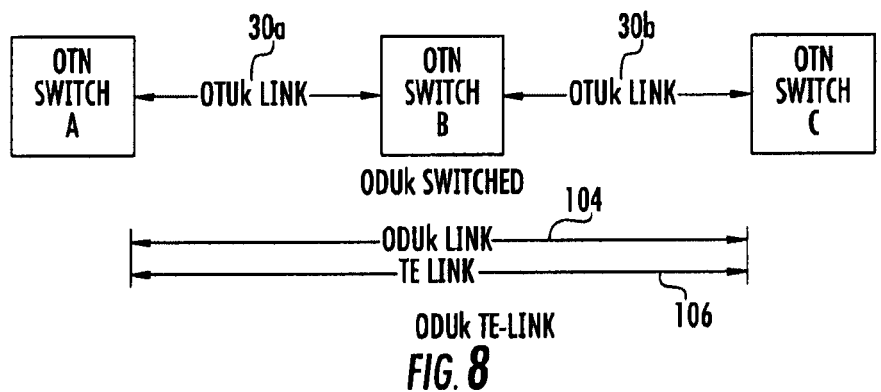
FIG. 8 is a block diagram of another section of the network depicted in FIG. 5 illustrating a second example of modeling TE-links. The TE-link bandwidth information is distributed between the switch nodes in accordance with embodiments of the present disclosure.

Referring to FIG. 7, an OTUk Link can be modeled as a TE-Link. Switching at ODUk layer and ODUj layer (including multi-stage multiplexing) can be managed on the OTUk TE-Link.

When a lower order ODU layer being switched on an OTUk interface involves multi-stage multiplexing, all of the higher order ODU layer(s) should terminate between the same pair of nodes A-B and B-C as the OTUk layer in this case. If multiple ODU layers are being terminated at a node, such as the node A, then various higher order ODUs can have different scopes. In other words, higher order ODU paths have two termination points—these correspond to source/sink roles in two directions of data flow. The scope of an ODU refers to the segment of the network 21 contained within the "begin" and "end" termination points. By stating that the higher order-ODUs have different scope, this means that all of the layers of ODUs don't need to terminate on the same two nodes, such as nodes A-B and B-C. Of course, terminating on the same nodes is just one possibility—not the only thing which is permitted. For example, if ODU1 layer switching is configured on an OTU3 link via multiplexing hierarchy ODU3←ODU2←ODU1, higher order ODUs (namely ODU3 & ODU2) should preferably terminate between the same pair of nodes A-B and B-C as the OTU3 layer. In this example, the link 30a is an OTUk link and corresponds with a TE link 102a, and the link 30b is an OTUk link and corresponds with a TE link 102b.

(b) ODUk TE-Link

When an ODUk layer does not terminate on the same pair of nodes A-B or B-C as an OTUk layer, an ODUk link 104 should be modeled as an ODUk TE-Link 106, and bandwidth is preferably directly managed on the ODUk TE-link 106. Switching at an ODUj layer (including multi-stage multiplexing) can be managed on the ODUk TE-Link 106.

When a lower order ODU layer being switched on the interface 22 and/or 24 involves multi-stage multiplexing, all of the higher order ODU layer(s) preferably terminate between the same pair of nodes A and C as the ODUk TE-link 106 in this case. For example, if ODU1 layer switching is configured on an ODU3 link via multiplexing hierarchy ODU3←ODU2←ODU1, higher order ODU (namely ODU2) should preferably terminate between the same pair of nodes as ODU3.

(c) ODUj TE-Link

Figure 9:
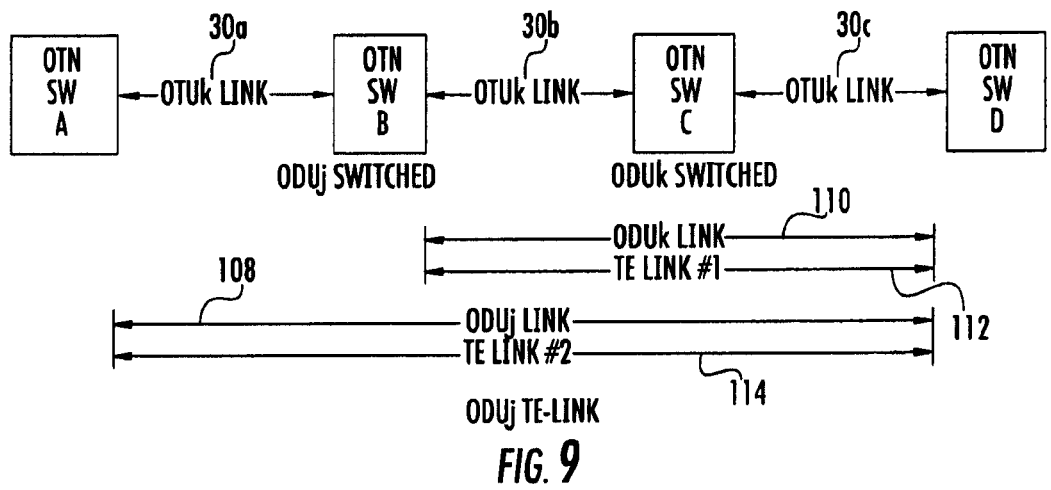
FIG. 9 is a block diagram of yet another section of the network depicted in FIG. 5 illustrating a third example of modeling TE-links. The TE-link bandwidth information is distributed between the switch nodes in accordance with embodiments of the present disclosure.

As shown in FIG. 9, when a lower order ODUj link 108 within a higher order ODUk link 110 does not terminate on the same pair of nodes B and D as the higher order ODUk link 110, separate TE-Links 112 and 114 should be modeled for the ODUk link 110 and ODUj link 108. Also, the ODUk link 110 shall no longer manage the bandwidth associated with the ODUj link 108. Switching at sub-ODUj layer (including multi-stage multiplexing) can be supported on the ODUj TE-Link 114.

When a lower order ODU layer being switched on an ODUj interface 22 and/or 24 involves multi-stage multiplexing, all the higher order ODU layer(s) should terminate between the same pair of nodes as ODUj in this case. For example, if ODU0 layer switching is configured on an ODU2 link via multiplexing hierarchy ODU2←ODU1←ODU0, higher order ODU (namely ODU1) should terminate between the same pair of nodes as ODU2.

(d) Bundle TE-Link

Any mix of OTU and ODU links of dissimilar rates that terminates on the same pair of nodes and meets all the bundling criterion specified in TE-Link Bundling specification [RFC4201] can be pulled together to form a Bundle TE-Link. As a result, improved scalability can be achieved.

An optical carrier group or optical tributary module can be modeled as a bundle of OTUk links that represent the Optical Channels.

TE Link Bandwidth Model

The bandwidth model set forth in this disclosure can be used for computing routes for ODU switching service and general bandwidth management on a given node A-K. Switching of all standard ODU rates including ODUflex can be supported. Further, when links 30a-l on the network 21 do not have capability (bandwidth or multiplexing) to switch an ODU container (newly introduced or large container), the client signal is inverse multiplexed into smaller ODU containers [ODUj-Xv] (which stands for a virtual concatenation of X*ODUj) and co-routed on the same set of optical channels or fibers such that differential delay between the member trails are within the stipulated range. This bandwidth model may also support co-routing of virtual concatenation members on the same component link or the same link bundle. The Bandwidth Model for OTU/ODU interfaces generally consists of two types of bandwidth information:

(a) Per ODU Rate Bandwidth

Unreserved bandwidth (in number of ODUs) at supported priority levels (e.g., max 8) is preferably captured for each ODU rate that can be switched on the interface 22 and/or 24. A link bundle is an association of several parallel links connecting the same pair of nodes whose attributes are either identical or sufficiently negligible that the traffic engineering domain can view the entire association as a single traffic engineered link. In the case of a link bundle, two sets of unreserved bandwidth might need to be maintained:

Max-Lsp-Bandwidth: The "Unreserved ODUs" of a bundled link at priority p (when eight priority levels are supported, p can be from 0 to 7, for example) is defined to be the maximum of the "Unreserved ODUs" at priority p of all of its component links.

Unreserved-Bandwidth: The "Unreserved ODUs" of a bundled link at priority p is defined to be the sum of the "Unreserved ODUs" at priority p of all of its component links.

For non-bundle cases, definition of Max-Lsp-Bandwidth can be the same as Unreserved-Bandwidth.

(b) ODUflex Bandwidth

ODUflex stands for a protocol for utilizing optical channel data units that are variable in the amount of data and/or data rate. ODUflex uses a variable number of Tributary Slots based on nominal rate of the client signal mapped into an ODUflex container. Absolute bandwidth value in bytes/sec can be advertised for ODUflex. If an OTU/ODU interface is composed of multiple ODU containers (through multi-stage multiplexing), the maximum of ODU-flex bandwidth unreserved across all sub-containers within the interface should be advertised. In a link-bundle case, this should be extended across all component links.

OSPF-TE Extensions for OTN Bandwidth Model

Referring now to FIG. 10, this section describes the OSPF TE-LSA (link state advertising) extensions to support bandwidth encoding for OTU/ODU TE-Links. OSPF stands for Open Short Path First.

Interface Switch Capability Descriptor

As specified in GMPLS Signaling Extensions for OTN [RFC4238], the following are the Switching and Encoding Types that are preferably used for OTU/ODU interface supporting ODU switching.

Switching Type=TDM [an example of which is defined in RFC3471]

Encoding Type=G.709 ODUk (Digital Path) [an example of which is defined in RFC4328]

An Interface Switching Capability Descriptor for TDM is defined in [RFC4203]. In accordance with the present disclosure, the current definition set forth in RFC4203 is extended to cover a bandwidth specification for different signal types, e.g., ODU layer(s). An exemplary link state advertising message 100 (which may also be referred to as an ISCD sub-TLV of Link TLV which is part of TE-LSA) is depicted in FIG. 10.

In general, the link state advertising message 100 is provided with a switching cap field 120, an encoding type field 122, a reserved field 124, a plurality of maximum label switched path bandwidth fields 126, a TDM switch capability section 128, and an ODUk switch capability specific information section 130. Exemplary values for the switching cap field 120, the encoding type field 122, the reserved field 124, the plurality of maximum label switched path bandwidth fields 126, and the TDM switch capability section 128 can be found in RFC-4202/RFC-4203.

More particularly, the switching cap field 120 can be set to TDM as set forth above. The encoding type field 122 defines the specific data encoding used within the switching technology type defined in the switching cap field 120 and can be set, for example, in accordance with G.709 ODUk.

The maximum LSP bandwidth 126 is preferably in bytes per second. More particularly, for an ODU encoding type, the field 126 should be coded with maximum bandwidth (in bytes per second) unreserved on a single ODUk/ODUj container associated with the given interface 22 or 24. If the interface 22 or 24 can be composed of multiple ODU containers (through multi-stage multiplexing), the ODU container with the highest unreserved capacity can be chosen for encoding information within the field 126. If the interface 22 or 24 does not support ODU-flex, the field 122 should be coded as a predetermined bitmap or value, such as zero.

The format and interpretation of the maximum label switched bandwidth field 126 should be consistent with the specification in GMPLS Routing Extension [RFC4202] and TE-Link Bundling Support [RFC4201] which provide that bandwidth can be encoded in bytes/second. The values within the maximum label switched path bandwidth fields 126 can be determined as follows:

Max LSP Bandwidth=Unreserved-TS-Count×TS-Nominal-Rate where, Unreserved-TS-Count can be the Number of OPU Tributary Slots unreserved on the ODU Container; and TS-Nominal-Rate can be the Nominal rate of an OPU Trib Slot on the ODU Container in Bytes per second.

When link bundling is involved, the interpretation of the field 126 is preferably consistent with OSPF G.709 Version 2.

TDM—Switch Capability Specific Information

As shown in FIG. 10, the TDM switch capability section 128 includes a minimum LSP bandwidth field 134, an indication field 136 and a reserved field 138. The format and interpretation of TDM—Switch Capability Specific Information should be as per OSPF GMPLS Extension [RFC4203] which provide that minimum LSP bandwidth can be encoded in bytes/second. More particularly, the minimum LSP bandwidth field 134 is used in conjunction with the Max LSP Bandwidth. The nominal rate of an OPU Tributary Slot in bytes per second should be coded in this attribute such that the following relationship is maintained:

ODUk Switch Capability Specific Information

The ODUk switch capability specific information section 130 includes, for at least two different types of signals, unreserved tributary slots in number of optical data units at supported priority levels. Per signal type bandwidth TLVs are a new sub-TLV added by the present disclosure for supporting ODUk switching. TLV stands for Type-Length-Value. Bandwidth information for at least one signal type should be included and separate sub-TLVs can be defined for fixed ODU containers and arbitrary rate containers (such as ODUflex). This should be included when encoding type is "G.709 ODUk". TLV type of ODUk-SCSI-TLV shall be coded as predetermined symbol(s) and/or value(s), such as 1. The ODUk switch capability specific information section 130 can contain one or more per signal type bandwidth information field 140, which may be characterized as an ODU-BW PerSignalType-BW-sub-TLV. The ODU-BW Per-SignalType-BW-sub-TLV can be included for each ODU rate (identified by Signal Type) that can be switched on the TE-Link. The TLV type of ODU-BW Per-SignalType-BW-sub-TLV shall be coded as a known identifier or value such as 1.

The format of the per signal type bandwidth information field 140 can include a signal type field 142, a length field 144, a bandwidth type field 146, a flags field 148, a reserved field 150, and a plurality of unreserved ODU fields 152 (preferably one ODU field 152 for each priority level, and only two of which have been labeled for purposes of clarity). It is possible to optimize this bandwidth information by including the unreserved bandwidth for the supported priority levels only. A bitmap (8 bits) can be added in place of reserved bytes to indicate the priority values (for example 8) for which unreserved bandwidth is advertised.

The signal type field 142 (e.g., 8 bits) can be coded as specified in OTN Signaling extension [RFC4238]. The values defined in [RFC4238] pertains to [G.709-v1] and can be extended to support additional ODU containers defined in more recent G.709 specifications [G.709-v3].

Exemplary values for the signal type field 142 are set forth below including the signal types that such values identify:

1 ODU1
2 ODU2
3 ODU3
4 ODU4 (100 Gbps)
5 ODU0 (1.25 Gbps)
10 ODUflex
11 ODU1e (10 Gbps Ethernet [GSUP.43])
12 ODU2e (10 Gbps Ethernet)
13 ODU3e1 (40 Gbps Ethernet [GSUP.43])
14 ODU3e2 (40 Gbps Ethernet [GSUP.43])
15-39 Reserved (for future)
40 ODU0_ANY (ODU0 and future 1.25 Gbps ODU variants)
41 ODU1_ANY (ODU1 and future 2.5 Gbps ODU variants)
42 ODU2_ANY (ODU2, ODU1e, ODU2e and future 10 Gbps ODU variants)
43 ODU3_ANY (ODU3, ODU3e1, ODU3e2 and future 40 Gbps ODU variants)
44 ODU4_ANY (ODU4 and future 100 Gbps ODU variants)
45 ODUflex_ANY
46-255 Reserved (for future)

Signal Types 40 to 45 can be used for further optimizing the bandwidth encoding by advertising a single bandwidth entry for all the ODU types (of almost same rate) switchable on a given interface.

For instance, assume an OTU interface that can be configured as OTU2 or OTU2 e or OTU1e. Though the interface can potentially switch ODU2 or ODU2e or ODU1e, it is wasteful to advertise separate PER-SIGNALTYPE-BW-TLV for each ODU2 variants namely ODU1e, ODU2e and ODU2. In such cases, ODU2_ANY can be used. It is important to note that when ODUj_ANY bandwidth entry is included, no separate bandwidth entry for individual ODUj variants must be present. The route computation engine should treat ODUj_ANY as a wildcard entry for all the ODUj variants of the same rate.

The bandwidth type field 146 preferably includes four bits and indicates the bandwidth type pertaining to the "Unreserved ODUs" field 152. The values supported are as follows: 0 Max LSP Bandwidth; 1 Unreserved Bandwidth; and 2-15 Reserved (for future).

The flags field 148 preferably includes four bits and should be interpreted as a bitmap. The interpretation of the flags field 148 is as follows: Bit zero–0 0=>Standard G.709 ODU Container, 1=>Vendor Specific ODU Container while the other three bits (i.e., 1-3 are Reserved (for future). The reserved bits should be coded within a predetermined symbol or value, such as zeros.

The unreserved ODU field 152 can be a predetermined length, such as 16 bits and indicates the maximum number of ODU Containers of a given Signal-Type unreserved on this TE-Link.

When Bw-Type (=0) is "Max-Lsp-Bandwidth", The "Unreserved ODUs" of a bundled link at priority p is defined to be the maximum of the "Unreserved ODUs" at priority p of all of its component links. When Bw-Type (=1) is "Unreserved-Bandwidth", The "Unreserved ODUs" of a bundled link at priority p is defined to be the sum of the "Unreserved ODUs" at priority p of all of its component links. Bw-Type of 1 (Unreserved Bandwidth) is not applicable when there is no link bundling.

Shown in FIG. 11 is a bandwidth information field 140*a* (e.g., sub-TLV) which may be included when an ODUflex signal type, e.g., signal types 10 and 45 set forth above is supported on the TE-Link. The TLV type of ODUFLEX-BW-TLV shall be coded as a predetermined symbol and/or value, such as 2.

It is possible to optimize this bandwidth information by including the unreserved bandwidth for the supported priority levels only. A bitmap (8 bits) can be added in place of reserved bytes to indicate the priority values (e.g., up to 8) for which unreserved bandwidth is advertised. All of the fields of the bandwidth information 140*a* are the same as that of bandwidth information 140 (and have been labeled the same) except that "Unreserved ODUs" in the bandwidth information field 140 has been replaced by "Unreserved BW in bytes/second" in the bandwidth information 140a. Unreserved bandwidth (preferably in bytes/sec) is represented in IEEE float-point format similar to Max-Lsp-Bandwidth in ISCD. Maximum bandwidth unreserved for ODUflex on the OTN interface can be coded in this attribute. If the OTU/ODU interface is composed of multiple ODU containers (through multi-stage multiplexing), the ODU container with the highest unreserved capacity for ODUflex shall preferably be chosen for encoding this attribute. Unreserved bandwidth (Bw) can be computed as follows:

Unreserved Bw (at Pi)=Max-Unreserved-TS-Count×
TS-Nominal-Rate where,

Max-Unreserved-TS-Count: Maximum OPU Tributary Slots unreserved for ODUflex service on a single ODU container.

TS-Nominal-Rate: Nominal rate of an OPU Trib Slot on the ODU Container in Bytes per second.

When Bw-Type (=0) is "Max-Lsp-Bandwidth", The "Unreserved Bw" of a bundled link at priority p can be defined to be the maximum of the "Unreserved Bw" at priority p of all of its component links.

When Bw-Type (=1) is "Unreserved-Bandwidth", the "Unreserved Bw" of a bundled link at priority p can be defined to be the sum of the "Unreserved Bw" at priority p of all of its component links.

Bw-Type of 1 (Unreserved Bandwidth) is not of much value for ODUflex signal type. It is not mandatory to include this bandwidth type even for bundled links.

EXAMPLES

Shown in FIG. 12 is an exemplary ODUk switch capability specific information section 130 for an OTU2 interface that only supports ODU2 switching. In this example, the Interface Switching Capability Descriptor should be coded as follows:

Max Lsp Bw=<ODU2 rate>//Nominal rate of ODU2 in bytes per second.

Min Lsp Bw=<ODU2 rate>//Nominal rate of ODU2 in bytes per second.

ODUk Switching Capability Specific Information: signal type=2, bandwidth type=0 (Max-LSP-Bw) and unreserved ODUs at Priority "P=1". ODUFLEX-BW-TLV will not be included as the ODUflex rate is not supported on the interface 22 or 24.

Shown in FIG. 13 is an exemplary ODUk switch capability specific information section 130 for an interface that supports switching at line rate ODU3 and lower rates—ODU0, ODU1, ODU2, ODU2e & ODUflex via multiplexing.

Max Lsp Bw=<ODU3 rate>//Nominal rate of ODU3 in bytes per second.

Min Lsp Bw=<ODU0 rate>//Nominal rate of ODU0 in bytes per second.

An exemplary ODUk Switching Capability Specific Information is set forth in FIG. 13.

Shown in FIG. 14 is an ODUk switch capability specific information section 130 for a link bundle involving OTU3, OTU2 and OTU2e interfaces 22 and 24 that supports switching at all standard LO-ODUs.

Max Lsp Bw=<ODU3 rate>//Nominal rate of ODU3 in bytes per second.

Min Lsp Bw=<ODU0 rate>//Nominal rate of ODU0 in bytes per second.

An exemplary ODUk Switching Capability Specific Information is set forth in FIG. 14. The unreserved ODUs can be determined using the multiplexing hierarchy of FIG. 1. Further since this example involves a bundled link, unreserved ODUs at the maximum LSP bandwidth and unreserved bandwidth are both included.

CONCLUSION

Thus, it will be appreciated that in the mesh network 21 where an operator allocates a common set of network resources such as timeslots on nodes 20 or 20a to set up optical channel data unit label switched paths, there was not a known mechanism that flooded or distributed bandwidth information per signal type between the nodes 20 or 20a, which then enabled operators of the nodes 20 and/or 20a to compute paths more effectively. Though the methodologies set forth herein are in the context of a shared mesh network that is optically based, such methodologies may apply to all transport networks that utilize a multiplexing hierarchy of signals.

The foregoing description provides illustration and description, but is not intended to be exhaustive or to limit the inventive concepts to the precise form disclosed. Modifications and variations are possible in light of the above teachings or may be acquired from practice of the methodologies set forth in the present disclosure.

Also, certain portions of the implementations have been described as "components" that perform one or more functions. The term "component," may include hardware, such as a processor, an application specific integrated circuit (ASIC), or a field programmable gate array (FPGA), or a combination of hardware and software.

Further, while implementations have been described in the context of an optical network, this need not be the case. These implementations may apply to an electronic network using copper cabling, or even a wireless network.

In addition, information regarding the optical channel data unit label switched paths can be stored and processed in a distributed fashion, or in a centralized fashion. For example, time slot information for the different multiplexing levels within the multiplexing hierarchy can be stored in 'Generalized Label Object' in respective PSB and RSB control blocks (PSB represents 'PATH state' and RSB represents 'RESV state'). The time slot information can be stored in a distributed fashion (distributed storage having multiple memory/storage devices) and processed in a distributed manner preferably by using a hop-to-hop processing. In another implementation, the distributed storage may be replaced by a centralized memory that stores the time slot information for all, or a subset, of the nodes 10 or 10a. In this situation, the nodes 10 or 10a may include communication paths to obtain the connection information from the centralized memory.

Even though particular combinations of features are recited in the claims and/or disclosed in the specification, these combinations are not intended to limit the disclosure. In fact, many of these features may be combined in ways not specifically recited in the claims and/or disclosed in the specification. Although each dependent claim listed below may directly depend on only one other claim, the disclosure includes each dependent claim in combination with every other claim in the claim set.

No element, act, or instruction used in the present application should be construed as critical or essential to the invention unless explicitly described as such outside of the preferred embodiment. Also, as used herein, the article "a" is intended to include one or more items. Where only one item is intended, the term "one" or similar language is used. Further, the phrase "based on" is intended to mean "based, at least in part, on" unless explicitly stated otherwise.

REFERENCES

The following references are hereby incorporated herein by reference.
[Reference 1] ITU-T Recommendation G.709 "Interfaces for the optical transport network (OTN)".
[RFC2119] Bradner, S., "Key words for use in RFCs to Indicate Requirement Levels".
[RFC3630] Katz, D., Kompella, K., and D. Yeung, "Traffic Engineering (TE) Extensions to OSPF Version 2", RFC 3630
[RFC3471] Berger, L., "Generalized Multi-Protocol Label Switching (GMPLS) Signaling Functional Description", RFC 3471, January 2003.
[RFC4201] Kompella, K., Rekhter, Y., and L. Berger, "Link Bundling in MPLS Traffic Engineering (TE)"
[RFC4203] Kompella, K. and Y. Rekhter, "OSPF Extensions in Support of Generalized Multi-Protocol Label Switching (GMPLS)"
[RFC4204] Lang, J., Ed., "Link Management Protocol (LMP)", RFC 4204, October 2005.
[RFC4328] Papadimitriou, D., "Generalized Multi-Protocol Label Switching (GMPLS) Signaling Extensions for G.709 Optical Transport Networks Control", RFC 4328, January 2006.
[RFC5339] Le Roux, J L. and D. Papadimitriou, "Evaluation of Existing GMPLS Protocols against Multi-Layer and Multi-Region Networks (MLN/MRN)", RFC 5339, September 2008.
[G.709-v3] ITU-T, "Interfaces for the Optical Transport Network (OTN)", G.709 Recommendation, December 2009.
[RFC3945] Mannie, E., "Generalized Multi-Protocol Label Switching (GMPLS) Architecture", RFC 3945, October 2004.
[G.709-v1] ITU-T, "Interface for the Optical Transport Network (OTN)," G.709 recommendation (and Amendment 1), February 2001 (October 2001).
[G.872] ITU-T, "Architecture of optical transport networks", November 2001 (November 2001).

What is claimed is:
1. A method comprising the steps of:
generating, by circuitry of a first node, a link state advertising message including bandwidth information indicative of unreserved number of optical channel data unit containers for a plurality of different types of signals supported by the first node; wherein the bandwidth information includes a first field and a second field, the first field is indicative of a first maximum label switched path (LSP) bandwidth at a first priority and the second field is indicative of a second maximum LSP bandwidth at a second priority different than the first priority, the link state advertising message further including:
an encoding field,
a switching cap field that identifies a switching technology that is time division multiplexing, such that the encoding field designates a data encoding used in the switching cap field,
a TDM switch capability specific information field including a minimum LSP bandwidth field,
wherein the first and second fields indicative of the first and second maximum LSP bandwidths, respectively, are provided in the link state advertising message between the encoding field and the TDM switch specific information field,
the first maximum LSP bandwidth being equal to a product of a first Unreserved TS-Count and a first TS-Nominal-Rate, the first Unreserved TS-Count being a number of first optical payload unit (OPU) tributary slots unreserved on a first optical data unit (ODU) container, and the first TS-Nominal-Rate being a nominal rate of each of the first OPU tributary slots, and
the second maximum LSP bandwidth being equal to a product of a second Unreserved TS-Count and a second TS-Nominal-Rate, the second Unreserved TS-Count being a number of second optical payload unit (OPU) tributary slots unreserved on a second optical data unit (ODU) container, and the second TS-Nominal-Rate being a nominal rate of each of the second OPU tributary slots;
transmitting the link state advertising message from the first node to a plurality of second nodes within a mesh network.

2. The method of claim 1, wherein the plurality of types of signals are within a multiplexing hierarchy of signals.

3. The method of claim 1, further including transmitting from the first node to the second node a plurality of types of signals, wherein the plurality of types of signals are multiplexed within a single higher order optical channel data unit (HO-ODUk) signal.

4. The method of claim 1, wherein the mesh network is selected from a group consisting of a shared-mesh Generalized Multiprotocol Label Switching (GMPLS) network, a linear GMPLS network, a ring GMPLS network, and combinations thereof.

5. The method of claim 1, wherein the first node supports at least three priority levels.

6. The method of claim 1, wherein the interface of the first node is a first interface, and wherein the first node includes a second interface with the first interface connected to a first link, and the second interface connected to a second link to form a link bundle.

7. The method of claim 1, further comprising providing an optical data unit label switched path including the first node within the mesh network using link state advertising message having at least one link bundle with a first optical channel transport unit OTUk link and a second OTUk link.

8. The method of claim 7, wherein the first and second OTUk links have at least one of different data rates, tributary slot bandwidths and different supported multiplexing hierarchies.

9. The method of claim 1, further including providing an optical data unit label switched path including the first node within the mesh network using the link state advertising message having at least one link bundle with a first optical channel data unit (ODU) link and a second ODU link.

10. The method of claim 9, wherein the first ODU link and the second ODU link have at least one of different combinations of ODU data rates, same/different tributary slot granularity, same/different supported multiplexing hierarchies.

11. The method of claim 10, wherein said at least of the plurality of types of signals with an arbitrary data rate is an optical data unit with the arbitrary data rate (ODUflex).

12. The method of claim 1, wherein the first node supports at least two priority levels, and wherein at least one of the plurality of types of signals has an arbitrary data rate.

13. The method of claim 1, wherein when the first maximum LSP bandwidth is associated with a nominal rate of ODU3 container, the minimum LSP bandwidth is a nominal rate of an ODU0 container.

14. A method comprising the steps of:
generating, by circuitry of a first node, a link state advertising message including bandwidth information indicative of unreserved number of optical channel data unit containers for a plurality of different types of signals supported by an interface of the first node;
transmitting the link state advertising message from the first node to a plurality of second nodes within a mesh network,
wherein the interface of the first node is a first interface, and wherein the first node includes a second interface with the first interface connected to a first link, and the second interface connected to a second link to form a link bundle, and with the first and second interfaces of the first node supporting at least two priority levels, and wherein the bandwidth information of the link state advertising message includes a first maximum label switched path (LSP) bandwidth field at a first priority and a second maximum LSP bandwidth field at a second priority, the link state advertising message further including:
an encoding field,
a switching cap field that identifies a switching technology that is time division multiplexing, such that the encoding field designates a data encoding used in the switching cap field,
a TDM switch capability specific information field including a minimum LSP bandwidth field,
wherein the first and second fields indicative of the first and second maximum LSP bandwidths, respectively, are provided in the link state advertising message between the encoding field and the TDM switch specific information field,
the first maximum LSP bandwidth being equal to a product of a first Unreserved TS-Count and a first TS-Nominal-Rate, the first Unreserved TS-Count being a number of first optical payload unit (OPU) tributary slots unreserved on a first optical data unit (ODU) container, and the first TS-Nominal-Rate being a nominal rate of each of the first OPU tributary slots, and
the second maximum LSP bandwidth being equal to a product of a second Unreserved TS-Count and a second TS-Nominal-Rate, the second Unreserved TS-Count being a number of second optical payload unit (OPU) tributary slots unreserved on a second optical data unit (ODU) container, and the second TS-Nominal-Rate being a nominal rate of each of the second OPU tributary slots.

15. The method of claim 14, wherein the first node has a plurality of optical channel data unit containers for the plurality of the different types of signals with first ones of the plurality of the optical channel data unit containers being identified in a label switched path and second ones of the plurality of the optical channel data unit containers, the number of second ones of the plurality of optical channel data unit containers being the unreserved number of optical channel data unit containers.

16. The method of claim 14, wherein the plurality of types of signals are within a multiplexing hierarchy of signals.

17. The method of claim 14, wherein the plurality of types of signals are multiplexed within a single higher order optical channel data unit (HO-ODUk) signal.

18. The method of claim 14, wherein the mesh network is selected from a group consisting of a shared-mesh Generalized Multiprotocol Label Switching (GMPLS) network, a linear GMPLS network, a ring GMPLS network, and combinations thereof.

19. The method of claim 14, wherein the first node supports at least two priority levels, and wherein the link state advertising message includes, for at least one of the plurality of different types of signals, unreserved number of optical channel data unit containers at the at least the first and second priorities.

20. The method of claim 14, further comprising providing an optical data unit label switched path including the first node within the mesh network using the bandwidth information of the link state advertising message having at least one link bundle with a first OTUk link and a second OTUk link.

21. The method of claim 20, wherein the first and second optical transport unit (OTUk) links have at least one of different data rates, tributary slot bandwidths and different supported multiplexing hierarchies.

22. The method of claim 14, wherein providing an optical data unit label switched path including the first node within the mesh network using the bandwidth information of the link state advertising message having at least one link bundle with a first optical channel data unite (ODU) link and a second ODU link.

23. The method of claim 22, wherein the first ODU link and the second ODU link have at least one of different combinations of ODU data rates, same/different tributary slot granularity, same/different supported multiplexing hierarchies.

24. The method of claim 14 wherein the first node supports at least two priority levels, and wherein at least one of the plurality of types of signals has an arbitrary data rate.

25. The method of claim 24, wherein said at least one of the plurality of types of signals with an arbitrary data rate is an optical channel data unit having the arbitrary data rate (ODUflex).

26. The method of claim 14, wherein when the first maximum LSP bandwidth is associated with a nominal rate of ODU3 container, the minimum LSP bandwidth is a nominal rate of an ODU0 container.

* * * * *